United States Patent [19]

Staples

[11] Patent Number: 5,401,320
[45] Date of Patent: Mar. 28, 1995

[54] METHOD OF ROCK DECONTAMINATION

[75] Inventor: Tony P. Staples, Houston, Tex.

[73] Assignee: Baker Hughes Incorporated

[21] Appl. No.: 164,193

[22] Filed: Dec. 9, 1993

[51] Int. Cl.⁶ .............................. B08B 3/02; B08B 3/08; B08B 7/00
[52] U.S. Cl. ...................................... 134/10; 134/25.1
[58] Field of Search .................................. 134/25.1, 10

[56] References Cited

U.S. PATENT DOCUMENTS

| | | | |
|---|---|---|---|
| 5,055,196 | 10/1991 | Darian et al. | 210/638 |
| 5,205,674 | 4/1993 | Chisholm et al. | 405/258 |
| 5,244,492 | 9/1993 | Cyr | 75/742 |
| 5,290,528 | 3/1994 | O'Connor et al. | 423/87 |

Primary Examiner—Melvyn J. Andrews
Assistant Examiner—Zeinab El-Arini
Attorney, Agent, or Firm—Rosenblatt & Associates

[57] ABSTRACT

Contaminated soil including rocks is mechanically screened to remove most of the soil from the rock. The rocks are then further screened and a liquid is sprayed over the rocks to wash the remaining contaminants from the rocks. The rocks are then recycled back to the original location. The wash fluid with the remaining contaminants is further screened, with the remaining fluids centrifuged in combination with the addition of a polymer to promote flocculation and further separation. The remaining liquid is recycled as spray wash liquid at the beginning of the process. The flocs and screened material are transported to a waste disposal site.

11 Claims, 1 Drawing Sheet

METHOD OF ROCK DECONTAMINATION

FIELD OF THE INVENTION

The field of the invention relates to a process for cleaning contaminants off of rocks or other solid material.

BACKGROUND OF THE INVENTION

In the past, many industrial sites have experienced operation malfunctions, leaks, spills, accidents, which have resulted in spillage of material that is poisonous, toxic, and which requires proper disposal. The costs of disposal have historically been high, and ways have been sought to economically dispose of such contaminated material. Simple disposal in landfills has been expensive due to the sheer bulk of the contaminated soil with the rocks which may be included with it.

The method of the present invention illustrates a technique in decontamination of the included rocks at a particular contaminated site so that the rocks may be returned in place while the contaminated soil is separated therefrom for ultimate sanitary disposal. Fluid used in the method can be disposed of in a commercial injection waste well.

SUMMARY OF THE INVENTION

Contaminated soil including rocks is mechanically screened to remove most of the soil from the rock. The rocks are then further screened and a liquid is sprayed over the rocks to wash the remaining contaminants from the rocks. The rocks are then recycled back to the original location. The wash fluid with the remaining contaminants is further screened, with the remaining fluids centrifuged in combination with the addition of a polymer to promote flocculation and further separation. The remaining liquid is recycled as spray wash liquid at the beginning of the process. The flocs and screened material are transported to a waste disposal site.

DETAILED DESCRIPTION OF THE PREFERRED EMBODIMENT

Figure 1:
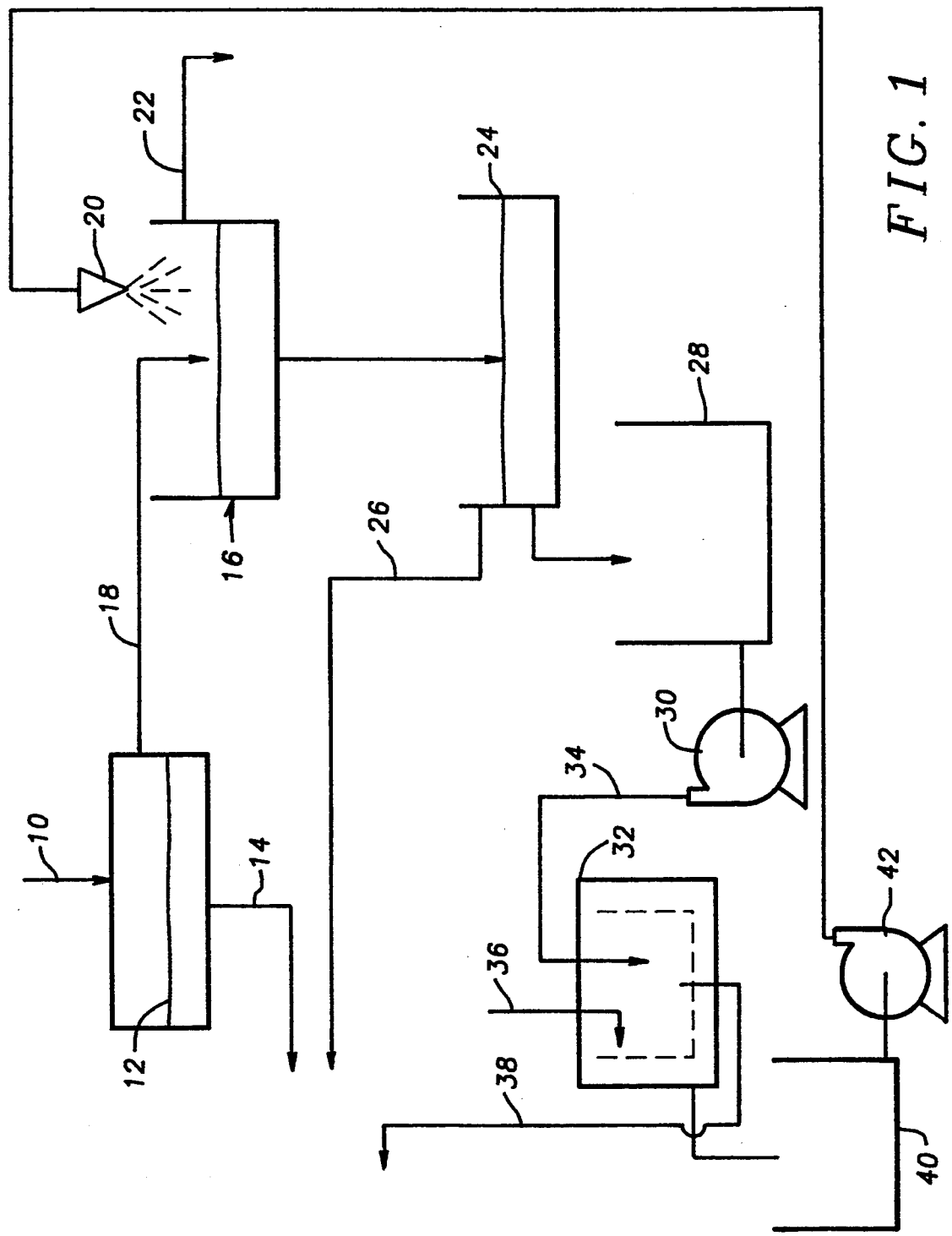
FIG. 1 schematically illustrates the process of the present invention.

To accomplish the method of the present invention, the contaminated rocks with the surrounding soil, represented by arrow 10, are dumped onto a grate 12. The dirt that may be attached to some of the rocks falls through the grate, as indicated by arrow 14. The dirt 14 must be properly disposed of in suitable landfill facilities or equivalent. The oversize, predominantly rocks, are delivered to screen 16 through a chute or some other suitable conveying device, represented by arrow 18. As the rocks hit the vibrating screen 16, they are washed with nozzle or nozzles 20. This procedure removes contaminants such as lead and TPH, as well as hydrocarbons, from the rocks. The rocks free of contaminants exit the vibrating screen 16 from a chute or other similar device, shown schematically as 22. The rocks leaving through chute 22 are effectively decontaminated and may be recycled to the original site. Such oversize leaving in chute 22 will not have to be taken to a landfill for other type of disposition. The contaminants that are washed through vibrating screen 16, along with all the fines, are screened again in vibrating screen 24. Vibrating screen 24 has a smaller-size opening than vibrating screen 16, with vibrating screen 24 typically in the range of 50-80 mesh. The oversize from vibrating screen 24 are taken to a landfill along with the dirt and contaminants which are the undersized materials from grate 12. The oversized materials are represented schematically by arrow 26. The undersized particles and liquid flow through to tank 28. Pump 30 feeds centrifuge 32 through line 34. A polymer that promotes flocculation, such as Allied Collied E-24, is added into centrifuge 32, as indicated by line 36. The remaining solid particles are captured within centrifuge 32 and ultimately discharged as flocs from centrifuge 32 through line 38 for ultimate disposal with the undersized from grate 12 and the oversized from screen 24. The liquids from centrifuge 32 that pass through its screen are held in tank 40 and are recycled to nozzle or nozzles 20 via pump 42.

Other types of physical separation equipment than vibratory screens 12, 16, or 24, can be used without departing from the spirit of the invention. Any type of filtration device can be used instead of centrifuge 32, although a centrifuge is preferred.

The process is easy to field-erect so that it can be employed at the contaminated site. Use of the process allows a significant reduction in weight and volume of material to be disposed of in sanitary landfills. The rocks included in contaminated soils can be easily and simply cleaned so that they may be returned to the site where the process equipment shown in FIG. 1 is field-erected for a specific cleaning procedure. The equipment can be self-contained on skids which are trucked to a site, with field personnel hooking up power and the necessary interconnecting lines. The process described includes a series of steps that gradually concentrate the amount of material to be sent to a landfill or other type of sanitary disposal so as to minimize cost and expense for the property owner. The addition of a flocculating agent improves the ability to coalesce the remaining fines in tank 28 so that they may be easily separated within centrifuge 32. While the polymer is shown to be added directly into centrifuge 32, it can be added further upstream without departing from the spirit of the invention. As previously stated, screen 24 is much finer than screen 16, with screen 16 being in the order of 2-3 mesh. Screen 16 is also finer than grating 12, which has even larger openings. While the illustration in FIG. 1 is schematic, those skilled in the art will appreciate that a variety of solids-handling equipment, including conveyors and elevators, may be employed to handle the material and move it between different pieces of processing equipment.

The foregoing disclosure and description of the invention are illustrative and explanatory thereof, and various changes in the size, shape and materials, as well as in the details of the illustrated construction, may be made without departing from the spirit of the invention.

I claim:

1. A method of decontamination of rocks in soil, comprising the steps of:

coarsely separating the rocks from a majority of the soil;

removing the separated soil for disposal;

washing the rocks, collected from said separating step, to dislodge remaining contaminated soil therefrom;

capturing wash fluid and any associated soil from said washing;

adding a flocculating agent to said captured wash fluid to facilitate separation of solids therefrom;

separating solids from said captured wash fluid; and recycling said captured wash fluid for said washing step.

2. The method of claim 1, wherein:

said coarse separation is accomplished by screening on a first screen.

3. The method of claim 2, wherein said washing step further comprises:

screening on a second screen which is finer than said first screen;

spraying said wash fluid on the rocks and remaining soil on said second screen;

replacing the decontaminated washed rocks in the area from which they came.

4. The method of claim 3, further comprising the step of:

screening on a third screen, finer than said second screen, the solids and liquid passing through said second screen.

5. The method of claim 4, wherein said capturing step further comprises:

collecting liquid and solids that pass through said third screen;

filtering out the solids from the liquid;

disposing of contaminated solids from said filtering, together with solids removed from said first screen and said third screen.

6. The method of claim 5, wherein said filtering step is accomplished with a centrifuge.

7. The method of claim 1, further comprising:

skid-mounting the components required for said steps for rapid transport and deployment at a contaminated site.

8. A method of decontaminating rocks in soil from a site, comprising:

screening the soil to separate at least in part the soil from the rocks;

washing the rocks with a fluid to remove remaining contaminants, said washing step further comprises:

spraying the fluid over the rocks and soil;

capturing fluid used for washing and the solids therein;

adding a flocculating agent to the fluid;

separating the flocs containing solids from said fluid;

filtering the separated fluid with a centrifuge;

recycling filtered fluid for further washing of new rocks; and returning the washed rocks to the site.

9. The method of claim 8, wherein:

said spraying is done during said screening.

10. The method of claim 9, wherein:

said screening is done in a progression of screens, each of which has progressively smaller openings.

11. The method of claim 10, wherein:

said screening is accomplished with a plurality of vibrating screens.

* * * * *